United States Patent
Kee et al.

(10) Patent No.: US 7,697,736 B2
(45) Date of Patent: Apr. 13, 2010

(54) FACE DETECTION METHOD AND APPARATUS USING LEVEL-SET METHOD

(75) Inventors: Seokcheol Kee, Seoul (KR); Dejun Wang, Beijing (CN); Jiali Zhao, Beijing (CN)

(73) Assignee: Samsung Electronics Co., Ltd, Suwon-si (KR)

( * ) Notice: Subject to any disclaimer, the term of this patent is extended or adjusted under 35 U.S.C. 154(b) by 1170 days.

(21) Appl. No.: 11/288,267

(22) Filed: Nov. 29, 2005

(65) Prior Publication Data

US 2006/0115161 A1    Jun. 1, 2006

(30) Foreign Application Priority Data

Nov. 30, 2004    (KR) ..................... 10-2004-0099029

(51) Int. Cl.
*G06K 9/00*    (2006.01)
(52) U.S. Cl. ..................................... 382/118
(58) Field of Classification Search ................. 382/118
See application file for complete search history.

(56) References Cited

U.S. PATENT DOCUMENTS

| | | | | |
|---|---|---|---|---|
| 4,975,969 A * | 12/1990 | Tal | ............. | 382/116 |
| 5,982,912 A * | 11/1999 | Fukui et al. | ............. | 382/118 |
| 6,044,168 A * | 3/2000 | Tuceryan et al. | ............. | 382/118 |
| 6,381,346 B1 * | 4/2002 | Eraslan | ............. | 382/118 |
| 7,177,471 B2 * | 2/2007 | Paraglos et al. | ............. | 382/173 |
| 7,277,582 B2 * | 10/2007 | Paragios | ............. | 382/199 |
| 7,317,816 B2 * | 1/2008 | Ray et al. | ............. | 382/118 |
| 7,483,553 B2 * | 1/2009 | Xu et al. | ............. | 382/118 |
| 2004/0123196 A1 * | 6/2004 | Shidla et al. | ............. | 714/724 |
| 2005/0044056 A1 * | 2/2005 | Ray et al. | ............. | 706/52 |

(Continued)

FOREIGN PATENT DOCUMENTS

WO    WO 02056241 A1 *    7/2002

OTHER PUBLICATIONS

Face detection with active contours, Jae Sik Chang, 978-3-540-22218-7 Springer, pp. 334-342.*

(Continued)

*Primary Examiner*—Samir A. Ahmed
*Assistant Examiner*—Jayesh Patel (57) ABSTRACT

A face detection method and apparatus using a level-set method. The method includes: laying a first initial shape model over a face image; evolving shape curves of the first initial shape model using the level-set method; detecting first through M-th neighboring boundary points that neighbor first through M-th initial boundary points of the first initial shape model, and that neighbor the evolved shape curves, M being a positive integer larger than 1; laying a modified shape model rendered using the detected first through M-th neighboring boundary points over the face image; detecting a rotation angle of the modified shape model; determining whether the detected rotation angle of the modified shape model is within a predetermined angle range; and selecting one of a second initial shape model, which is rotated to the left, or a third initial shape model, which is rotated to the right, according to the detected rotation angle, and laying the selected initial shape model over the face image, and returning to the detecting of the first through M-th neighboring boundary points, when the detected rotation angle of the modified shape model is outside the predetermined angle range.

12 Claims, 9 Drawing Sheets

U.S. PATENT DOCUMENTS

2006/0028466 A1* 2/2006 Zhou et al. ................. 345/420
2007/0003138 A1* 1/2007 Hobson et al. .............. 382/173

OTHER PUBLICATIONS

Face detection with active contours using color information, Jae et al., Springer, 978-3-540-22218-7, pp. 334-343.*

Jae et al., Face detection with active contours using color information, SpringerLink, Jun. 16, 2004, 978-3-540-22218-7, pp. 334-343.*

Facial model estimation—sequence, Chung et al, IEEE, 1520-9210/03, Mar. 2003, pp. 8-23.*

* cited by examiner

FACE DETECTION METHOD AND APPARATUS USING LEVEL-SET METHOD

CROSS-REFERENCE TO RELATED APPLICATION

This application claims the benefit of Korean Patent Application No. 10-2004-0099029, filed on Nov. 30, 2004, in the Korean Intellectual Property Office, the disclosure of which is incorporated herein in its entirety by reference.

BACKGROUND OF THE INVENTION

1. Field of the Invention

The present invention relates to an image processing apparatus, such as a digital camera, and more particularly, to a face detection method and apparatus using a level-set method that is capable of quickly detecting the shape of a face from an image.

2. Description of the Related Art

Image processing devices use principal component analysis (PCA) in order to detect human faces. PCA is a technique of dividing a learning image into a plurality of eigen images that represent features of the learning image using the statistical characteristics of the learning image and then rendering an image using a linear combination of the eigen images.

In other words, PCA, which is one of the most widely used face detection methods, analyzes arbitrary input data using principal components extracted using a plurality of eigenvalues and a plurality of eigenvectors.

However, PCA is vulnerable to variations in pose and illumination. In other words, PCA provides low face detection rates especially when detecting a face in an image where a person horizontally or vertically moves his or her face or where illumination abruptly changes.

BRIEF SUMMARY

An aspect of the present invention provides a face detection method using a level-set method.

An aspect of the present invention also provides a face detection apparatus using a level-set method.

According to an aspect of the present invention, there is provided a face detection method using a level-set method, the method including: laying a first initial shape model, which has a front viewpoint, over a face image; evolving shape curves of the first initial shape model using the level-set method; detecting first through M-th neighboring boundary points that neighbor first through M-th initial boundary points of the first initial shape model, and that neighbor the evolved shape curves, M being a positive integer larger than 1; laying a modified shape model rendered using the detected first through M-th neighboring boundary points over the face image; detecting a rotation angle of the modified shape model; determining whether the detected rotation angle of the modified shape model is within a predetermined angle range; and selecting one of a second initial shape model, which is rotated to the left, or a third initial shape model, which is rotated to the right, according to the detected rotation angle, and laying the selected initial shape model over the face image, and returning to the detecting of the first through M-th neighboring boundary points, when the detected rotation angle of the modified shape model is outside the predetermined angle range.

According to another aspect of the present invention, there is provided a face detection apparatus using a level-set method, the apparatus including: a shape curve evolution control unit, which evolves shape curves of a first initial shape model using the level-set method, the first initial shape model having a front viewpoint; a neighboring boundary point detection control unit, which detects first through M-th neighboring boundary points that neighbor first through M-th initial boundary points of the first initial shape model, M being a positive integer larger than 1; a model rotation angle detection unit, which detects a rotation angle of a modified shape model rendered using the detected first through M-th neighboring boundary points; an angle range determination unit, which determines whether the detected rotation angle of the modified shape model is within a predetermined angle range; and a shape model arrangement control unit, which lays one of the first initial shape model, the modified shape model, a second initial shape model rotated to the left, and a third initial shape model rotated to the right over a face image.

According to another aspect of the present invention, there is provided a face detection method, including: laying a first initial shape model over a face image; evolving shape curves of the first initial shape model using a level-set method; detecting first through M-th neighboring boundary points, the neighboring boundary points neighboring first through M-th initial boundary points of the first initial shape model and the evolved shape curves, M being a positive integer larger than 1; laying over the face image a modified shape model rendered using the detected first through M-th neighboring boundary points; detecting a rotation angle of the modified shape model; determining whether the detected rotation angle is within a predetermined angle range; and selecting a second initial shape model or a third initial shape model according to the detected rotation angle, and laying over the face image the selected initial shape model, when the detected rotation angle is not within the predetermined angle range.

According to another aspect of the present invention, there is provided a computer-readable storage media encoded with processing instructions for causing a processor to execute the above-described face detecting methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
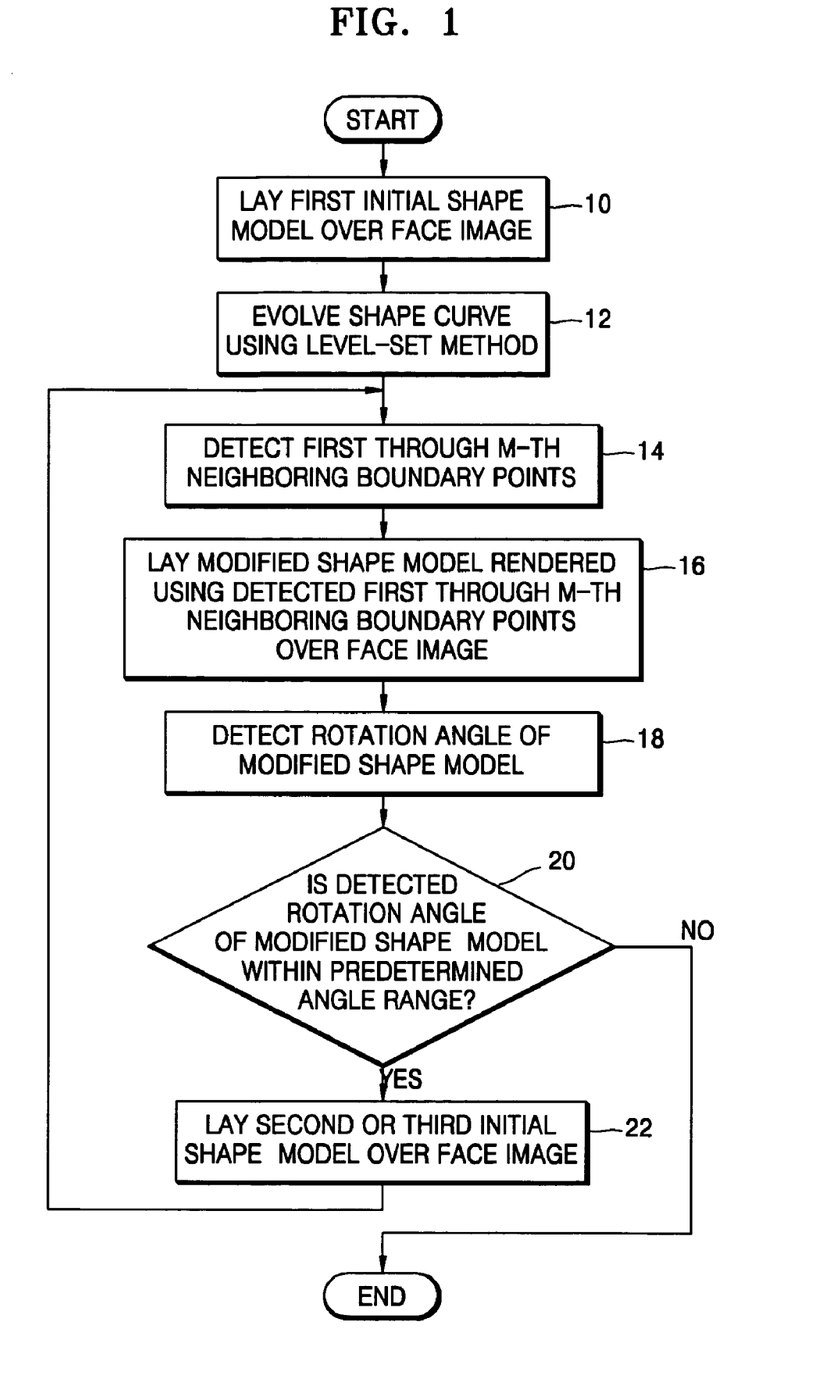
FIG. 1 is a flowchart of a face detection method using a level-set method, according to an exemplary embodiment of the present invention.

FIG. 1 is a flowchart of a face detection method using a level-set method, according to an exemplary embodiment of the present invention. Referring to FIG. 1, in operation 10, a first initial shape model is laid over a face image. The size of the first initial shape model is adjusted in accordance with the size of the face image, and then the first initial shape model is laid over the face image.

In operation 12, shape curves of the first initial shape model are evolved with reference to the first initial shape model using a level-set method. The level-set method is a mathematical method of evolving a curve represented as a level set.

$$C=\{(x,y):\phi(x,y)=0\} \quad (1)$$

where C represents a contour, and $\phi$ is a level function. The contour C is represented as a zero level set, as shown in Equation (1).

Thereafter, the contour C is evolved in a normal line direction by a velocity F using Equation (2):

$$\frac{\partial \phi}{\partial t} = |\nabla \phi| F \quad \phi(0, x, y) = \phi_0(x, y). \quad (2)$$

An initial contour is expressed using Equation (3):

$$\{(x,y)|\phi_0(x,y)=0\} \quad (3).$$

$$NBW=\min\{\phi \in skeleton\} \quad (4)$$

where NBW represents narrow bandwidth, i.e., an evolution range of the shape curves.

In short, in operation 12, the shape curves are evolved using Equations (1) through (4).

Figure 2A:
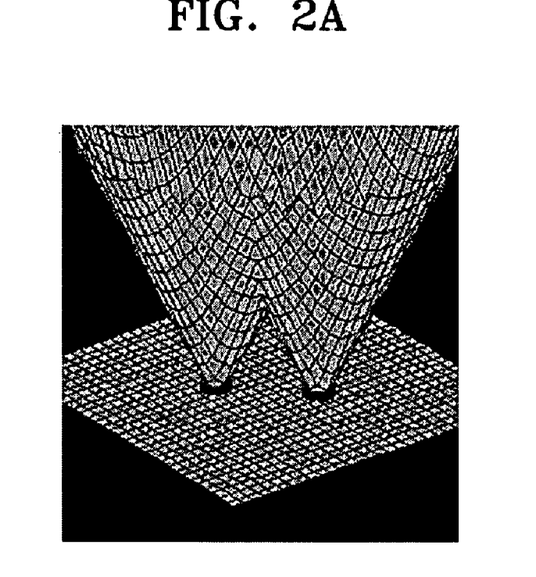
FIGS. 2A and 2B are diagrams examples of shape curves generated using the level-set method.
Figure 2B:
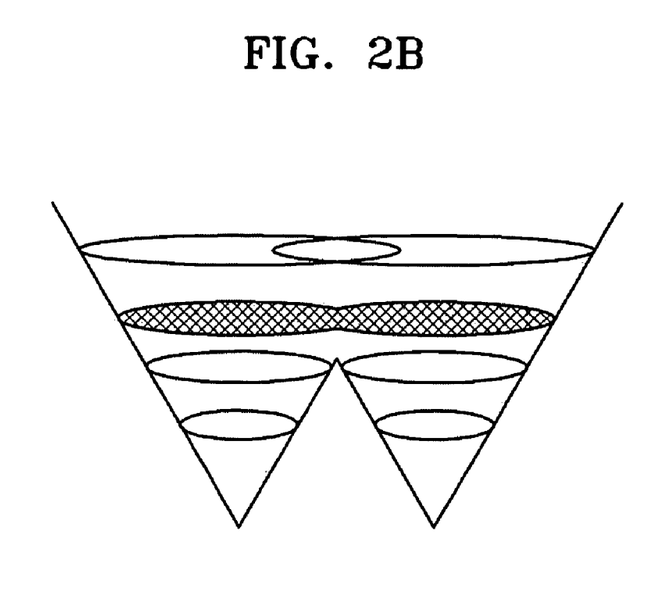

FIGS. 2A and 2B are examples of shape curves generated using the level-set method. Referring to FIGS. 2A and 2B, shape curves are evolved to become more similar to the shape of a face in the face image.

In operation 12, the shape curve is evolved using a set of points determined based on geometric information and the rotation angle of the first initial shape model. For example, the shape curves may be evolved using portions of the first initial shape model representing the eyes in the face image.

Figure 3:
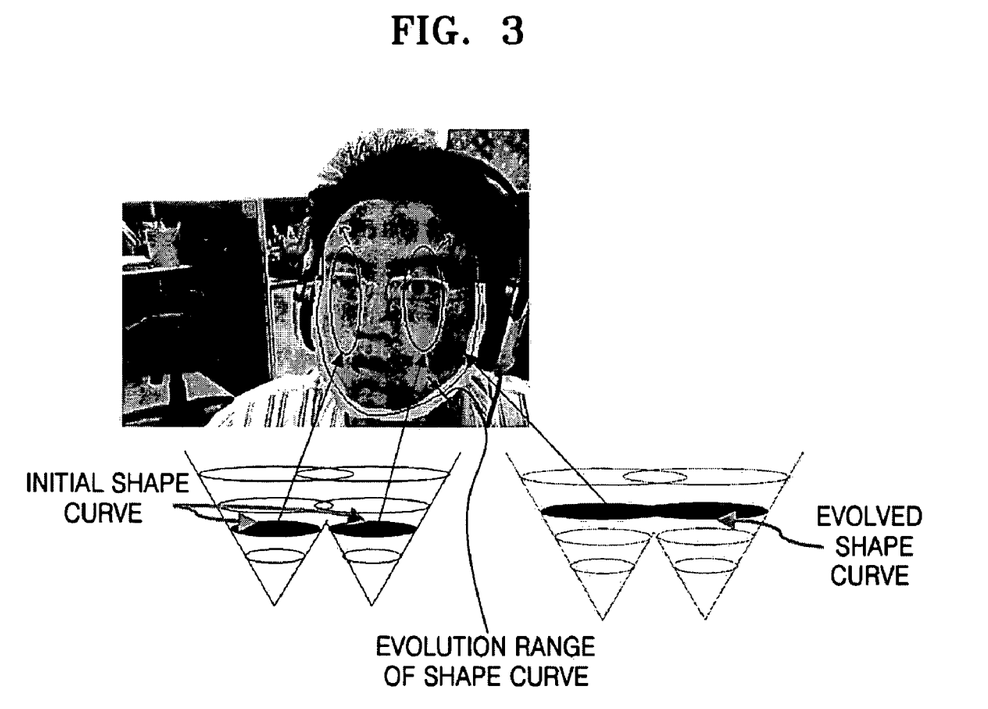
FIG. 3 is a diagram illustrating initial shape curves generated using the level-set method and shape curves obtained by evolving the initial shape curves.

FIG. 3 is a diagram illustrating examples of initial shape curves generated using the level-set method and shape curves obtained by evolving the initial shape curves. Referring to FIG. 3, initial shape curves are laid over a face image with reference to portions of the first initial shape model representing the eyes in the face image. Thereafter, the initial shape curves are evolved.

In operation 14, first through M-th (where M is a positive integer larger than 1) neighboring boundary points neighboring first through M-th initial boundary points, respectively, of the first initial shape model are detected.

Figure 4:
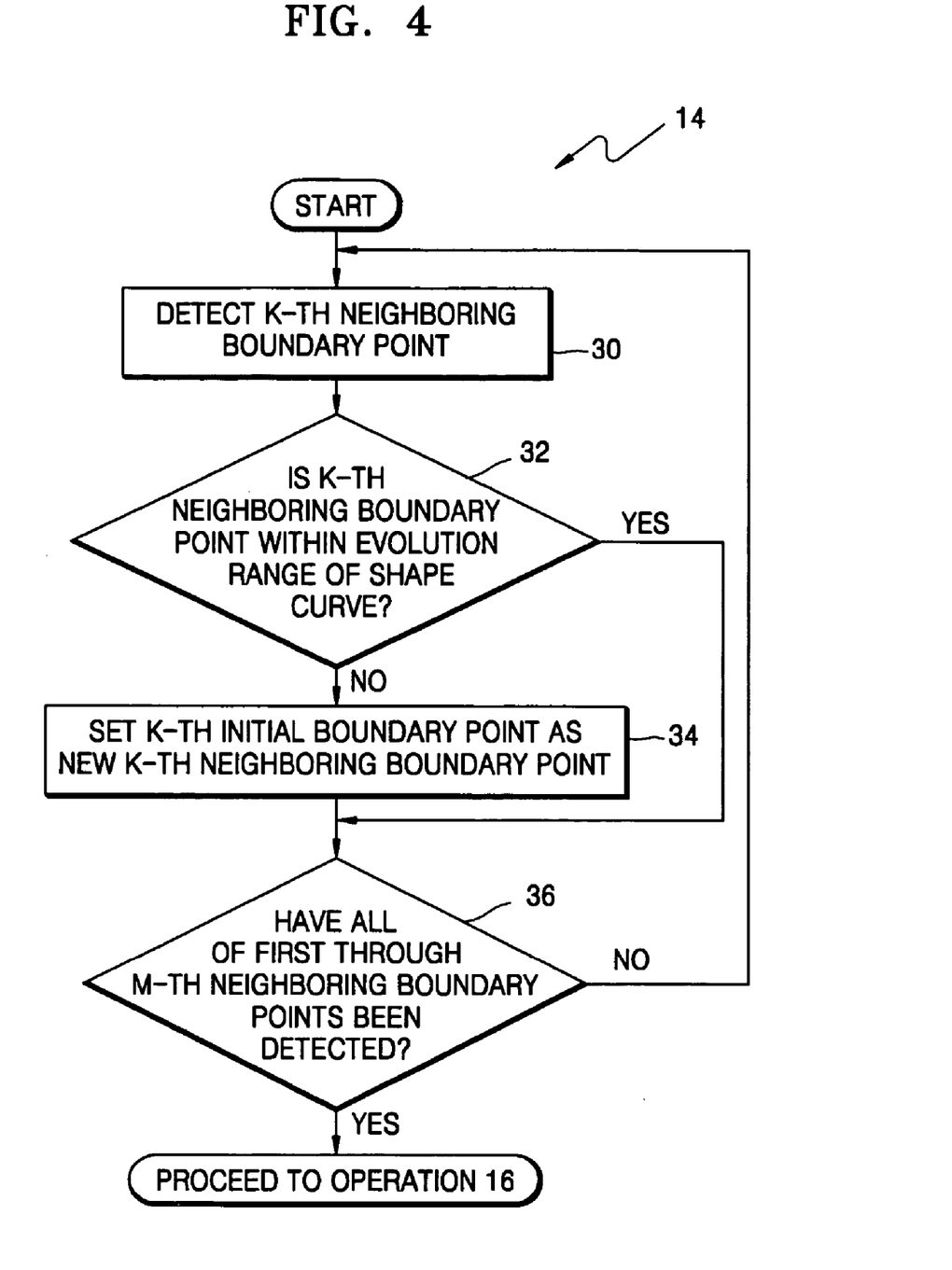
FIG. 4 is a detailed flowchart of operation 14 of FIG. 1.

FIG. 4 is a flowchart of an example of operation 14 of FIG. 1. Referring to FIG. 4, in operation 30, a K-th (where K is a positive integer between 1 and M) neighboring boundary point that neighbors a K-th boundary point of the first initial shape model is detected.

In operation 32, it is determined whether the detected K-th neighboring boundary point is within an evolution range of the shape curves. The evolution range of the shape curves is a width within which the shape curves move when evolved, as shown in FIG. 3. If the detected K-th neighboring boundary point is within the evolution range of the shape curves, the face detection method proceeds to operation 36. If the detected K-th neighboring boundary point is within the evolution range of the shape curves, it is considered as an appropriate neighboring boundary point for detecting a face shape from the face image.

However, if the detected K-th neighboring boundary point is outside the evolution range of the shape curves, the K-th initial boundary point, instead of the detected K-th neighboring boundary point, is set as a new K-th neighboring boundary point in operation 34. If the detected K-th neighboring boundary point is outside the evolution range of the shape curves, it is considered inappropriate for detecting a face shape from the face image. Therefore, if the detected K-th neighboring boundary point is outside the evolution range of the shape curves, the detected K-th neighboring boundary point is treated as a meaningless neighboring boundary point, and the K-th initial boundary point, instead of the detected K-th neighboring boundary point, is set as a new K-th neighboring boundary point.

In operation 36, if the detected K-th neighboring boundary point is within the evolution range of the shape curves, it is determined whether all of the first through M-th neighboring boundary points corresponding to the first through M-th initial boundary points, respectively, have already been detected.

If not all of the first through M-th neighboring boundary points have been detected, the face detection method returns to operation 30, and operations 30 through 36 are repeated.

Referring to FIG. 1, in operation 16, a modified shape model rendered using the first through M-th neighboring boundary points detected in operation 14 is laid over the face image. The modified shape model represents the shape of the face in the face image more successfully than the first initial shape model.

In operation 18, the rotation angle of the modified shape model is detected. The rotation angle of the modified shape model laid over the face image is detected using coordinates of a portion of the modified shape model representing the center of the mouth in the face image, coordinates of a portion of the modified shape model representing the center of one of the eyes in the face image, and the distance between the eyes of a person using Equation (5):

$$A = \tan^{-1}\left(\frac{2 \times (d - 2 \times (m - i))}{d \times (5 - s)}\right) \quad (5)$$

where A represents the rotation angle of the modified shape model, d is the distance between the eyes of a person, m is the coordinates of the portion of the modified shape model representing the center of the mouth in the face image, i represents the coordinates of the portion of the modified shape model representing the left or right eye in the face image, and (m−i) is half of the distance between the left and right eyes in the face image calculated using the distance between the center of the mouth in the face image and the center of the left or right eye in the face image. Accordingly, (m−i) is doubled, and then, a difference (d−2(m−i)) between the doubling result 2(m−i) and the distance d is calculated. Thereafter, the rotation angle of the modified shape model is determined based on the difference (d−2(m−i)). Here, it is assumed that the center of the mouth in a face image is always located in the middle of the eyes in the face image regardless of whether the face image is a rotated face image or a frontal face image. In addition, supposing that the shape of the face in the face image is cylindrical, s in Equation (5) is an average size of cylindrical face models generated through training.

In operation 20, it is determined whether the rotation angle of the modified shape model is within or outside a predetermined angle range. The predetermined angle range is a range of critical angles referenced for determining whether to replace the initial shape model with the modified shape model. For example, if the predetermined angle range is between −5° and 5°, it is determined whether the rotation angle of the modified shape model is between −5° and 5°. If it is determined in operation 20 that the rotation angle of the modified shape model is within the predetermined angle range, the process ends.

In operation 22, if the rotation angle of the modified shape model is outside the predetermined angle range, one of a second initial shape model rotated to the left or a third initial shape model rotated to the right according to the detected rotation angle is selected and is laid over the face image, and the face detection method returns to operation 14. For example, if the predetermined angle range is between −5° and 5° and the rotation angle of the modified shape model is larger than 5°, the second initial shape model rotated to the left is laid over the face image. If the rotation angle of the modified shape model is smaller than −50, the third initial shape model rotated to the right is laid over the face image.

Figure 5A:
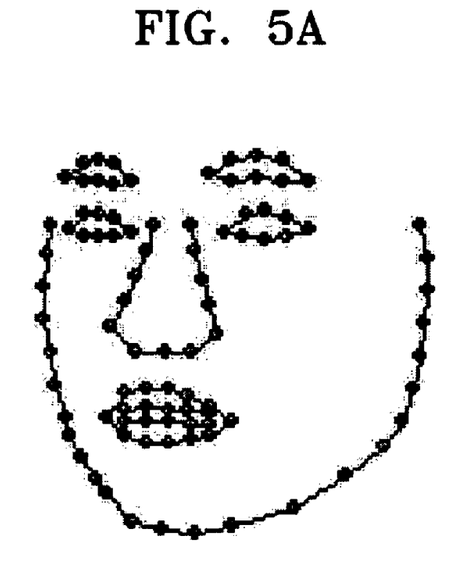
FIGS. 5A and 5B are diagrams illustrating second and third initial shape models, respectively.
Figure 5B:
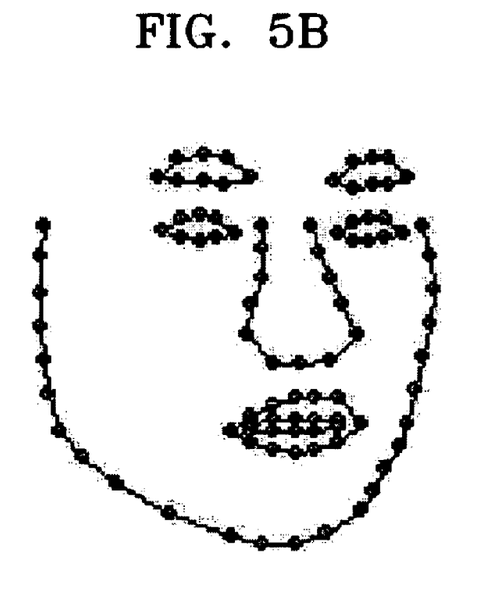

FIG. 5A is a diagram illustrating an example of the second initial shape model, and FIG. 5B is a diagram illustrating an example of the third initial shape model.

After the second or third initial shape model is laid over the face image, operations 14 through 22 are repeated until an appropriate face shape is detected from the face image.

Figure 6A:
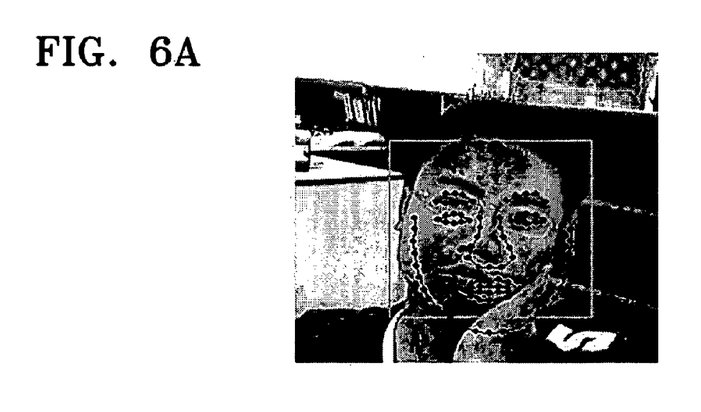
FIGS. 6A through 6C are diagrams illustrating frontal face images for comparing the face detection capability of the face detection method of FIG. 1 with the face detection capability of a conventional face detection method.
Figure 6B:
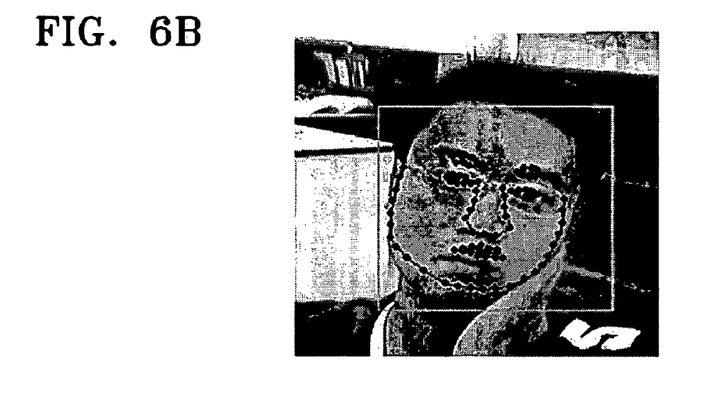
Figure 6C:
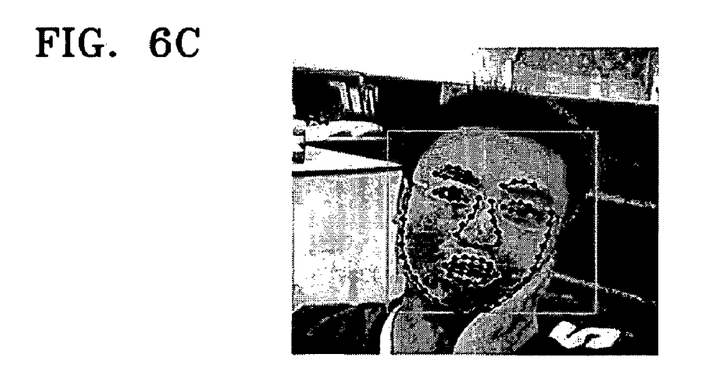

FIGS. 6A through 6C are diagrams illustrating frontal face images for comparing the face detection capability of the face detection method of FIG. 1 with the face detection capability of a conventional face detection method. Specifically, FIG. 6A illustrates a first initial shape model laid over a frontal face image, FIG. 6B illustrates a face shape detected from the frontal face image using a conventional face detection method, and FIG. 6C illustrates a face shape detected from the frontal face image using the face detection method of FIG. 1. Referring to FIGS. 6B and 6C, the face detection method of FIG. 1 can detect a face shape from a frontal face image with lower error rates than the conventional face detection method.

Figure 7A:
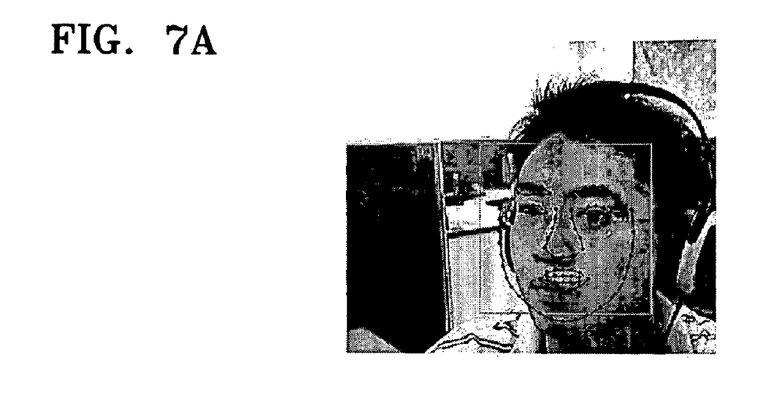
FIGS. 7A through 7C are diagrams illustrating face images slightly rotated to the left for comparing the face detection capability of the face detection method of FIG. 1 with the face detection capability of a conventional face detection method.
Figure 7B:
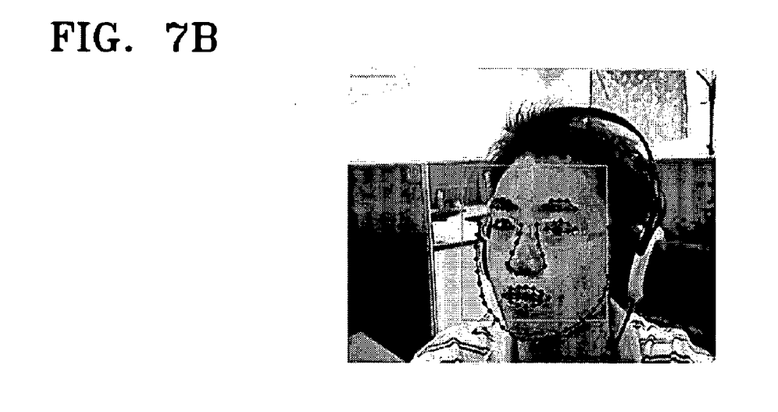
Figure 7C:
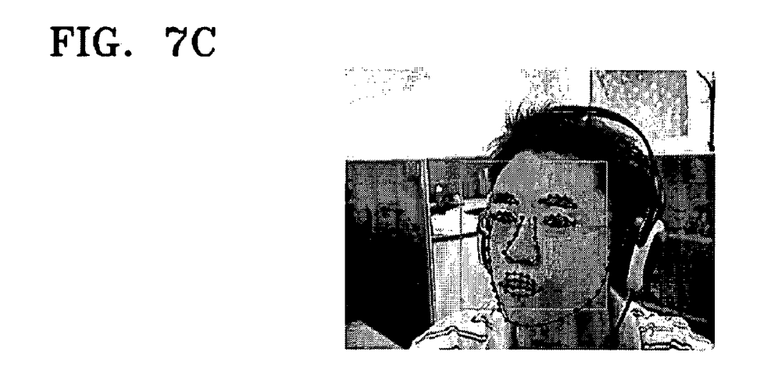

FIGS. 7A through 7C are diagrams illustrating face images slightly rotated to the left for comparing the face detection capability of the face detection method of FIG. 1 with the face detection capability of a conventional face detection method. Specifically, FIG. 7A illustrates a first initial shape model laid over a face image rotated to the left, FIG. 7B illustrates a face shape detected from the rotated face image using a conventional face detection method, and FIG. 7C illustrates a face shape detected from the rotated face image using the face detection method of FIG. 1. Referring to FIGS. 7B and 7C, the face detection method of FIG. 1 can detect a face shape from a face image rotated to the left or to the right with lower error rates than the conventional face detection method.

Figure 8:
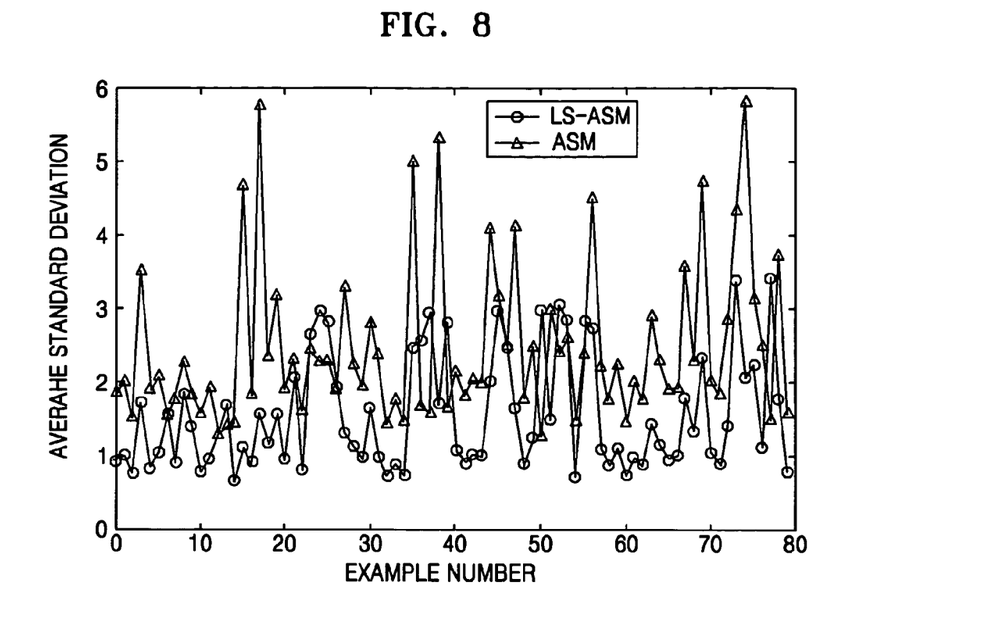
FIG. 8 is a graph for comparing the face detection capability of the face detection method of FIG. 1 with the face detection capability of a conventional face detection method.

FIG. 8 is a graph comparing the face detection capability of the face detection method of FIG. 1 with the face detection capability of a conventional face detection method. Referring to FIG. 8, the face detection method of FIG. 1 can detect a face shape with lower error rates than the conventional face detection method.

Figure 9:
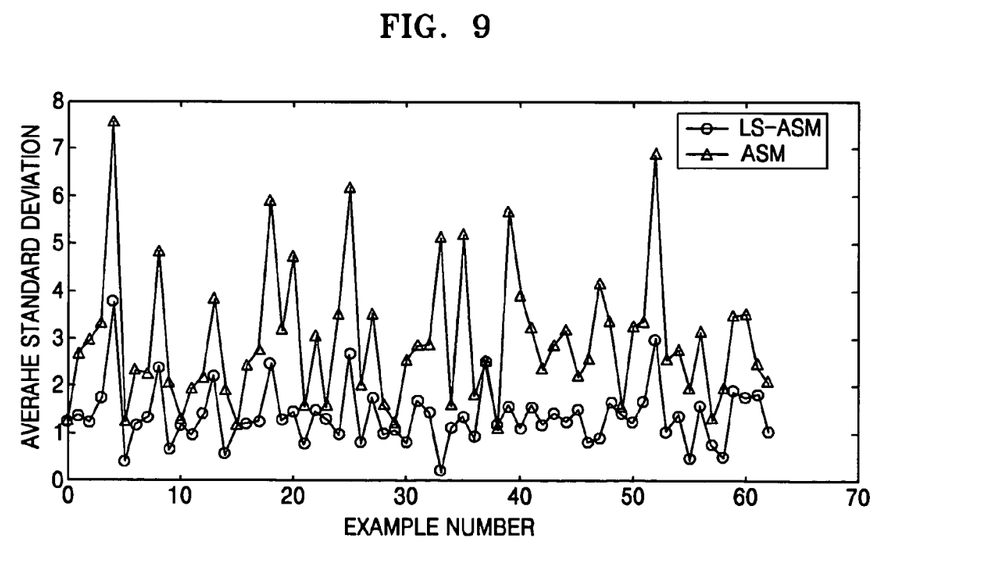
FIG. 9 is a graph for comparing the eye detection capability of the face detection method of FIG. 1 with the eye detection capability of a conventional face detection method.

FIG. 9 is a graph comparing the eye detection capability of the face detection method of FIG. 1 with the eye detection capability of a conventional face detection method. Referring to FIG. 9, the face detection method of FIG. 1 can detect eye locations from a face image with lower error rates than the conventional face detection method.

Figure 10:
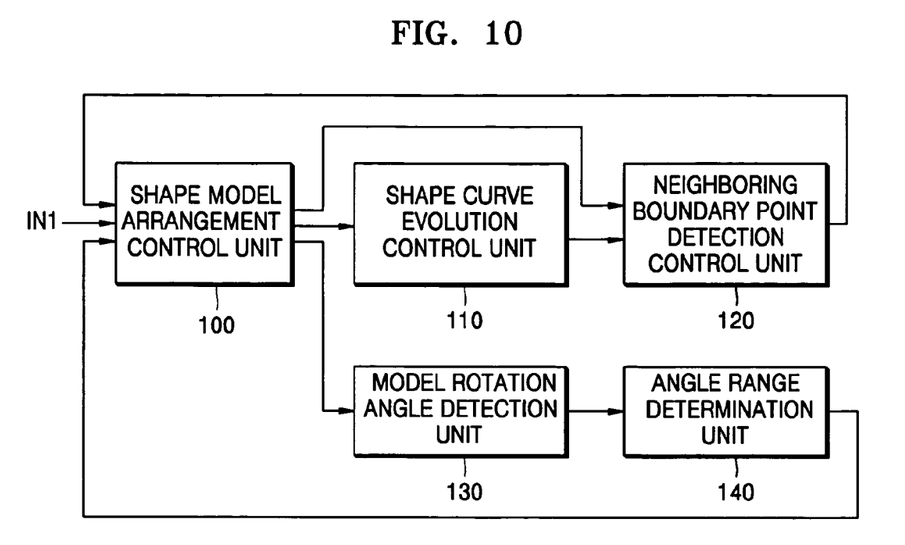
FIG. 10 is a block diagram of a face detection apparatus using the level-set method, according to an exemplary embodiment of the present invention.

FIG. 10 is a block diagram of a face detection apparatus using a level-set method, according to an exemplary embodiment of the present invention. Referring to FIG. 10, the face detection apparatus includes a shape model arrangement control unit 100, a shape curve evolution control unit 110, a neighboring boundary point detection control unit 120, a model rotation angle detection unit 130, and a angle range determination unit 140.

The shape model arrangement control unit 100 receives a command to control the detection of the shape of a face from a face image via an input port IN1, lays a first initial shape model over the face image, and outputs the face image with the first initial shape model laid thereover to the shape curve evolution control unit 110. The shape model arrangement control unit 100 adjusts the size of the first initial shape model according to the size of the face in the face image and relays the adjusted first initial shape over the face image.

The shape curve evolution control unit 110 evolves shape curves with reference to the first initial shape model, which has a front viewpoint, using the level-set method and outputs the evolved shape curves to the neighboring boundary point detection control unit 120.

The shape curve evolution control unit 110 evolves the shape curves using a set of points determined based on geometric information and the rotation angle of the first initial shape model The neighboring boundary point detection control unit 120 detects first through M-th (where M is a positive integer larger than 1) neighboring boundary points that neighbor first through M-th initial boundary points, respectively, of the first initial shape model with reference to the evolved shape curves and outputs the detected first through M-th neighboring boundary points to the shape model arrangement control unit 100.

Figure 11:
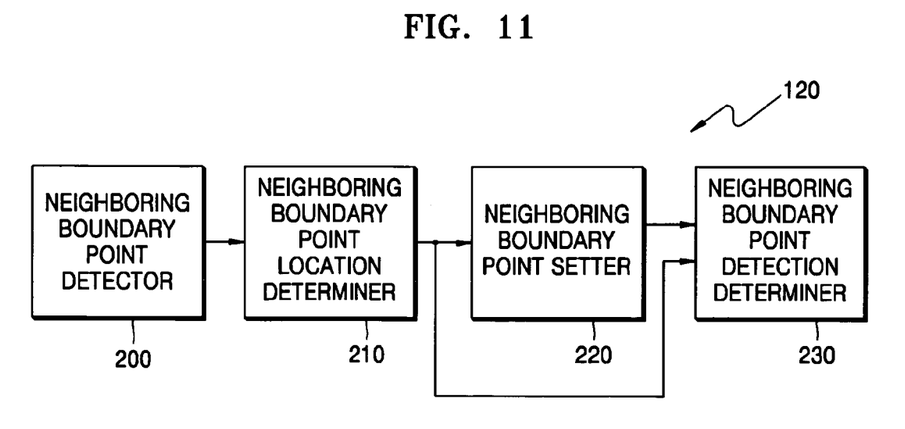
FIG. 11 is a detailed block diagram of a neighboring boundary point detection controller of FIG. 10.

FIG. 11 is a detailed block diagram of an example of the neighboring boundary point detection control unit 120 of FIG. 10. Referring to FIG. 11, the neighboring boundary point detection control unit 120 includes a neighboring boundary detector 200, a neighboring boundary point location determiner 210, a neighboring boundary point setter 220, and a neighboring boundary point detection determiner 230.

The neighboring boundary point detector 200 detects a K-th (where K is a positive integer between 1 and M) neighboring boundary point that neighbors a K-th initial boundary point of the first initial shape model and outputs the detected K-th neighboring boundary point to the neighboring boundary point location determiner 210.

The neighboring boundary point location determiner 210 determines whether the detected K-th neighboring boundary point is within an evolution range of the shape curves and outputs the determination results to the neighboring boundary point setter 220 and the neighboring boundary point detection determiner 230.

The neighboring boundary point setter 220 sets the K-th initial boundary point as a new K-th neighboring boundary point based on the determination results provided by the neighboring boundary point location determiner 210. Specifically, if the determination results provided by the neighboring boundary point location determiner 210 show that the detected K-th neighboring boundary point is outside the evolution range of the shape curves, the neighboring boundary point setter 220 sets the K-th initial boundary point, instead of the detected K-th neighboring boundary point, as a new K-th neighboring boundary point and outputs the setting results to the neighboring boundary point detection determiner 230. Since the detected K-th neighboring boundary point is considered inappropriate for detecting a face shape from the face image if it is outside the evolution range of the shape curves, the neighboring boundary point setter 220 treats the detected K-th neighboring boundary point as a meaningless neighboring boundary point and sets the K-th initial boundary point as a new K-th neighboring boundary point.

The neighboring boundary point detection determiner 230 determines whether all of the first through M-th neighboring boundary points have been detected when it receives the determination results from the neighboring boundary point location determiner 210 and receives the setting results from the neighboring boundary point setter 220.

If the detected K-th neighboring boundary point is within the evolution range of the shape curves, it is considered appropriate for detecting a face shape from the face image.

Referring to FIG. 10, the shape model arrangement control unit 100 lays a modified shape model rendered using the first through M-th neighboring boundary points detected by the neighboring boundary point control unit 120 over the face image and outputs the face image with the modified shape model laid thereover to the model rotation angle detection unit 130.

The model rotation angle detection unit 130 detects the rotation angle of the modified shape model and outputs the detected rotation angle of the modified shape model to the angle range determiner 140.

The model rotation angle detection unit 130 is characterized by detecting the rotation angle of the modified shape model using coordinates of a portion of the modified shape model representing the center of the mouth in the face image, coordinates of a portion of the modified shape model representing the center of one of the eyes in the face image, and the distance between the eyes of a person. The model rotation angle detection unit 130 detects the rotation angle of the modified shape model using Equation (4).

The angle range determination unit 140 determines whether the detected rotation angle of the modified shape model is within a predetermined angle range and outputs the determination results to the shape model arrangement control unit 100.

The shape model arrangement control unit 100 lays a second initial shape model, which is rotated to the left, or a third initial shape model, which is rotated to the right, over the face image. Specifically, if the determination results provided by the angle range determination unit 140 show that the detected rotation angle of the modified shape model is outside the predetermined angle range, the shape model arrangement control unit 100 selects one of the second and third initial shape models based on whether the detected rotation angle of the modified shape model is larger than the maximum of the predetermined angle range or is smaller than the minimum of the predetermined angle range and lays the selected initial shape model over the face image.

In this manner, the face detection apparatus of FIG. 10 can detect an optimum face shape from the face image.

Embodiments of the present invention also include computer-readable storage media. Thus, for example, the face detection method described above according to an embodiment of the present invention can be embodied in a computer-readable storage medium. A computer-readable storage medium is any data storage device that can store data which can be thereafter read by a computer system. Examples of such computer-readable storage media include read-only memory (ROM), random-access memory (RAM), CD-ROMs, magnetic tapes, floppy disks, and optical data storage devices.

The face detection method and apparatus using a level-set method, according to the above-described embodiments of the present invention can detect a face shape from a face image regardless of whether the face image is a frontal face image or a rotated face image without the need to detect eye locations first from the face image.

In addition, the face detection method and apparatus using a level-set method, according to the above-described embodiments of the present invention can provide low error rates.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A face detection method using a level-set method, comprising:

laying, under control of a processor, a first initial shape model, which has a front viewpoint, over a face image;

evolving shape curves of the first initial shape model laid over the face image using the level-set method;

detecting first through M-th neighboring boundary points that neighbor first through M-th initial boundary points of the first initial shape model, and that neighbor the evolved shape curves, M being a positive integer larger than 1;

laying a modified shape model rendered using the detected first through M-th neighboring boundary points over the face image;

detecting a rotation angle of the modified shape model;

determining whether the detected rotation angle of the modified shape model is within a predetermined angle range; and selecting one of a second initial shape model, which is rotated to the left, or a third initial shape model, which is rotated to the right, according to the detected rotation angle, and laying the selected initial shape model over the face image, and returning to the detecting the first through M-th neighboring boundary points, when the detected rotation angle of the modified shape model is outside the predetermined angle range.

2. The face detection method of claim 1, wherein, in the evolving shape curves using the level-set method, the shape curves are evolved using a set of points determined based on geometric information and the rotation angle of the first initial shape model.

3. The face detection method of claim 1, wherein the detecting of the first through M-th neighboring boundary points comprises:

detecting a K-th neighboring boundary point that neighbors a K-th initial boundary point of the first initial shape model, K being a positive integer between 1 and M;

determining whether the detected K-th neighboring boundary point is within an evolution range of the shape curves;

setting the K-th initial boundary point, instead of the detected K-th neighboring boundary point, as a new K-th neighboring boundary point, wherein if the detected K-th neighboring boundary point is not within the evolution range of the shape curves; and     determining whether all of the first through M-th neighboring boundary points have been detected;

wherein, when the detected K-th neighboring boundary point is within the evolution range of the shape curves, the face detection method proceeds to the determining whether all of the first through M-th neighboring boundary points have been detected, and when not all of the first through M-th neighboring boundary points have been detected, the face detection method returns to the detecting the K-th neighboring boundary point.

4. The face detection method of claim 1, wherein, in the detecting of the rotation angle of the modified shape model, the rotation angle of the modified shape model is detected using coordinates of a portion of the modified shape model representing a mouth in the face image, coordinates of a portion of the modified shape model representing a center of one of plural eyes in the face image, and the distance between the eyes of the face image.

5. The face detecting method of claim 4, wherein the rotation angle of the modified shape model is detected using the following equation:

$$A = \tan^{-1}((2 \times (d - 2 \times (m-i))/(d \times (5-s)),$$

wherein A represents the rotation angle of the modified shape model, d is a distance between eyes of a person, m is the coordinates of a portion of the modified shape model representing the center of the mouth in the face image, i represents the coordinates of a portion of the modified shape model representing a left eye or a right eye in the face image, and (m−i) is half of the distance between the left and right eyes in the face image calculated using the distance between the center of the mouth in the face image and the center of the left eye or right eye in the face image.

6. The face detecting method of claim 1, wherein the predetermined angle is between −5 degrees and 5 degrees.

7. A face detection apparatus using a level-set method, comprising:

a shape curve evolution control unit, which evolves shape curves of a first initial shape model laid over a face image using the level-set method, the first initial shape model having a front viewpoint;

a neighboring boundary point detection control unit, which detects first through M-th neighboring boundary points that neighbor first through M-th initial boundary points of the first initial shape model, M being a positive integer larger than 1;

a model rotation angle detection unit, which detects a rotation angle of a modified shape model rendered using the detected first through M-th neighboring boundary points;

an angle range determination unit, which determines whether the detected rotation angle of the modified shape model is within a predetermined angle range; and     a shape model arrangement control unit, under control of a processor, which lays one of the first initial shape model, the modified shape model, a second initial shape model rotated to the left, and a third initial shape model rotated to the right over a face image.

8. The face detection apparatus of claim 7, wherein the shape curve evolution control unit evolves the shape curves using a set of points determined based on geometric information and the rotation angle of the first initial shape model.

9. The face detection apparatus of claim 7, wherein the neighboring boundary point detection control unit comprises:

a neighboring boundary point detector, which detects a K-th neighboring boundary point that neighbors a K-th initial boundary point of the first initial shape model, K being a positive integer between 1 and M;

a neighboring boundary point location determiner, which determines whether the detected K-th neighboring boundary point is within an evolution range of the shape curves;

a neighboring boundary point setter, which sets the K-th initial boundary point, instead of the detected K-th neighboring boundary point, as a new K-th neighboring boundary point; and     a neighboring boundary point detection determiner, which determines whether all of the first through M-th neighboring boundary points have been detected.

10. The face detection apparatus of claim 7, wherein the model rotation angle detection unit detects the rotation angle of the modified shape model using coordinates of a portion of the modified shape model representing a mouth in the face image, coordinates of a portion of the modified shape model representing a center of one of plural eyes in the face image, and a distance between the eyes of the face image.

11. A computer-readable storage medium encoded with processing instructions for causing a processor to execute a face detection method, the method comprising:

laying a first initial shape model, which has a front viewpoint, over a face image;

evolving shape curves of the first initial shape model using the level-set method;

detecting first through M-th neighboring boundary points that neighbor first through M-th initial boundary points of the first initial shape model, and that neighbor the evolved shape curves, M being a positive integer larger than 1;

laying a modified shape model rendered using the detected first through M-th neighboring boundary points over the face image;

detecting a rotation angle of the modified shape model;

determining whether the detected rotation angle of the modified shape model is within a predetermined angle range; and     selecting one of a second initial shape model, which is rotated to the left, or a third initial shape model, which is rotated to the right, according to the detected rotation angle, and laying the selected initial shape model over the face image, and returning to the detecting the first through M-th neighboring boundary points, when the detected rotation angle of the modified shape model is outside the predetermined angle range.

12. A face detection method, comprising:

laying, under control of a processor, a first initial shape model over a face image;

evolving shape curves of the first initial shape model laid over the face image using a level-set method;

detecting first through M-th neighboring boundary points, the neighboring boundary points neighboring first through M-th initial boundary points of the first initial shape model and the evolved shape curves, M being a positive integer larger than 1;

laying over the face image a modified shape model rendered using the detected first through M-th neighboring boundary points;

detecting a rotation angle of the modified shape model;

determining whether the detected rotation angle is within a predetermined angle range; and selecting a second initial shape model or a third initial shape model according to the detected rotation angle, and laying over the face image the selected initial shape model, when the detected rotation angle is not within the predetermined angle range.

* * * * *